United States Patent [19]

Maier et al.

[11] Patent Number: 4,750,659

[45] Date of Patent: Jun. 14, 1988

[54] DEVICE FOR DRAWING A WEB INTO A WEBFED MACHINE

[75] Inventors: Peter Maier, Worms; Arnold Niedermaier, Beindersheim, both of Fed. Rep. of Germany

[73] Assignee: Albert-Frankenthal AG, Fed. Rep. of Germany

[21] Appl. No.: 7,202

[22] Filed: Jan. 27, 1987

[30] Foreign Application Priority Data

Feb. 13, 1986 [DE] Fed. Rep. of Germany ....... 3604504

[51] Int. Cl.⁴ .......................... B41F 13/02; G03B 1/56

[52] U.S. Cl. ....................................... 226/92; 101/228

[58] Field of Search ........................... 226/91, 92, 195; 101/225, 228; 34/117, 120

[56] References Cited

U.S. PATENT DOCUMENTS 4,111,122 9/1978 Kutzner et al. .................... 226/92 X
4,404,907 9/1983 Köbler et al. ......................... 101/228
4,480,801 11/1984 Stone ................................ 226/92 X

*Primary Examiner*—Stuart S. Levy
*Assistant Examiner*—Lynn M. Sohacki
*Attorney, Agent, or Firm*—Jones, Tullar & Cooper

[57] ABSTRACT

The invention is concerned with improvements in a web draw-in system for a web printing press comprising printing units with register rolls around which the web is trained, a draw-in bar to be attached to the leading end of the web and two tractive elements extending along the side frames of the press and guided by bend pulleys following the web path in the press. The tractive elements extend from one drum at one end of the press to a further drum at the other end so that they may be wound onto and unwound from such drums moving the draw-in bar along the web path. In order to ensure a low degree of strain on the tractive elements, and for this reason a substantial removal of stress from the servo means moving the register rolls the drums are each driven synchronously in either direction of rotation by a main drive connected with them via respective differentials, more especially in the form of harmonic drives or other epicyclic systems whose further input shaft is connected with an ancillary drive means which is controlled by a monitoring device sensing the tension in at least one of the tractive elements. The ancillary drive device may thus be turned in either direction. Near a position halfway along the web path there is a locking device for locking the tractive elements except when the web is being drawn in or the tractive elements are being rewound. The monitoring device are operative when the tractive elements are so locked.

34 Claims, 1 Drawing Sheet

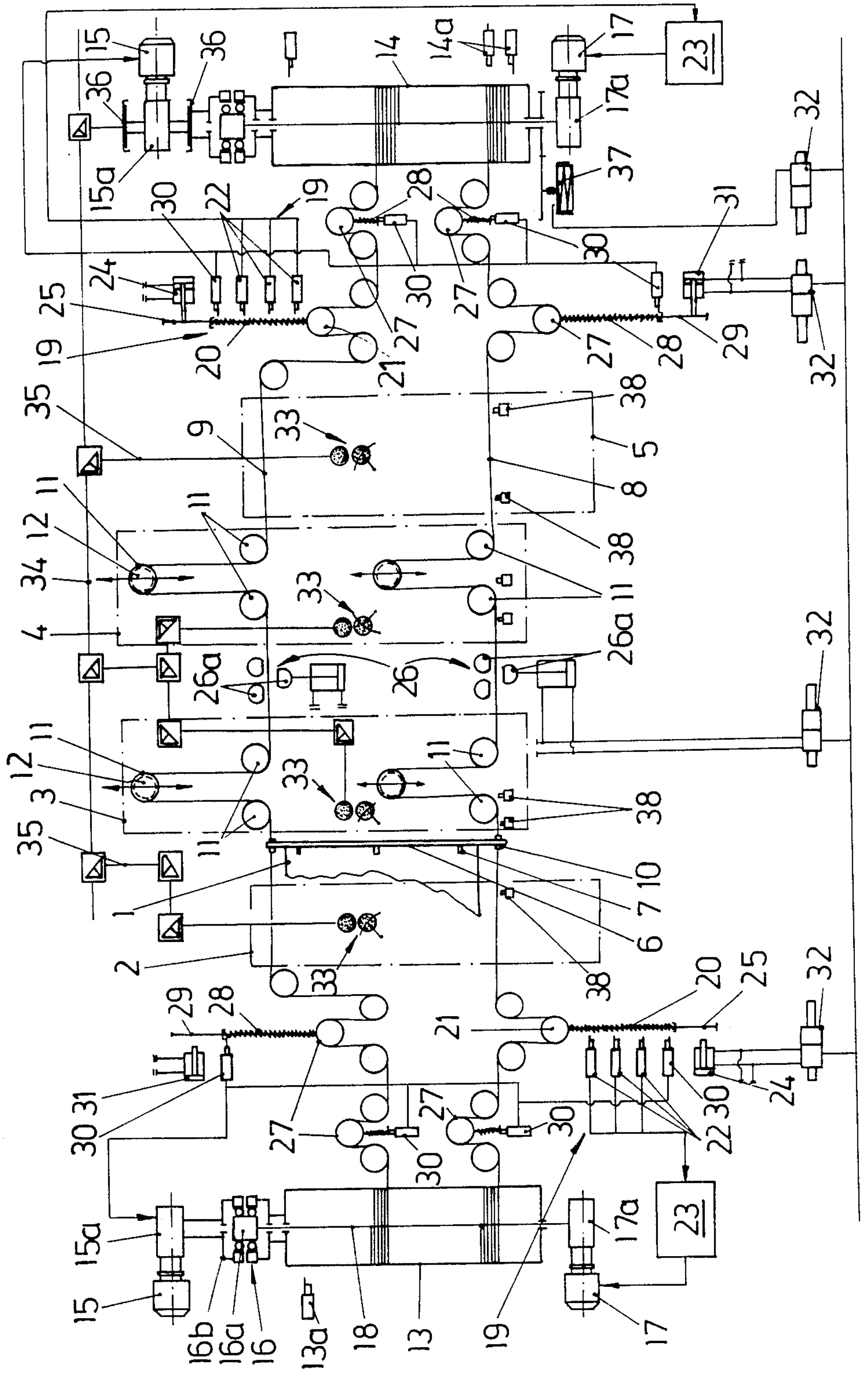

DEVICE FOR DRAWING A WEB INTO A WEBFED MACHINE

BACKGROUND OF THE INVENTION

1. Field of the Invention

The invention relates to a device for drawing a web into a machine adapted to process the web, and more specifically to such a device for pulling a web of paper into a webfed rotary printing press. The press has at least two printing units with register rolls around which the paper is run, a pull-in bar to be detachably connected to the leading end of the web, and traction elements of finite length running over bend pulleys arranged adjacent to the side frames of the press, such elements extending along the full path along which the web is to be drawn into the press for printing on it so that the ends of the traction elements at one end of the press are attached to a driven winch drum at one end of the draw-in path and the opposite ends of the elements are attached to a further driven winch drum at the other end of the press. The traction elements may be wound and unwound from the two respective winch drums to move the pull-in bar through the machine along the path to be followed by the web.

2. Description of the Related Art

A paper web draw-in device of this type has been proposed in the prior art in which the winch drums arranged at the front and rear ends of the pull-in path have individual hydraulic drive motors which are so operated that it is only the drive motor, that is to the front in the direction of draw, that is activated. The rear drive motor at the other end of the press is just caused to rotate by the front drive motor and acts as a brake. During printing the two motors brake the traction elements. Accordingly in this known arrangement a heavy strain is built up in the traction elements since in the draw-in operation not only friction acts on the tractive elements since tension has to be exerted on the pull-in bar, but in addition the forces necessary to override the dragging effect of the opposite drive motor acts on the tractive elements, and such overriding force may be very substantial in the case of a hydraulic motor in the form of hysteresis. The sample applies for regular running of the press in which, owing to the motion of the register rolls, the braking effect exerted on the tractive elements also results in an increase in the strain on them. This heavy strain in the tractive elements however not only means that they are likely to snap and to cause injury to pressmen, but also that the register roll control system is heavily loaded and this may lead to failure to properly register. It is in fact to be assumed in this connection that the register rolls, around which the paper web is trained, have to be fitted with bend pulleys at their ends for the tractive elements so that the servo drive of the register rolls will be biased in one direction and motion in the other direction will be opposed. In the prior art the consequence of this has been the necessity of providing oversized servo drives for the register rolls and this is a factor having a generally unfavorable effect on the overall costs and complexity of the printing press.

Another remedy attempted in the prior art has been the provision of a tractive element take up and pay off device reacting to any change in the setting of the register rolls leading to a change in the free length of the tractive elements. However such a system greatly increases the general complexity of the press, since a substantial length of tractive elements has to be taken up and released when the register rolls are displaced.

SUMMARY OF THE INVENTION

Taking this line of development in webfed presses as a starting point one object of the present invention is to devise a system as initially specified with simple and low-priced components which is so improved that on drawing in the web, on the winding back of the tractive elements and also on normal running of the press, tensile strains in the tractive elements are comparatively low.

A still further aim of the present invention is to devise such a system which is such that on web draw-in, on reversal of the tractive elements and during press operation, tensile strains in the tractive elements are comparatively low without involving a complex or bulky design of the press.

In order to achieve these and other objects appearing in the course of the present specification and claims, the winch drums are driven synchronously through a main drive means in both directions by means of a respective differential drive transmitting torque, and by a respective associated ancillary drive devices controlled by a monitoring device responding to the tension of at least one of the tractive elements, which are able to be turned in either direction of rotation. In addition a tractive element locking device is mounted generally at the middle of the draw-in path so that the tractive elements may be locked when no pull-in or return winding operation is taking place, while at the same time the monitoring devices associated with the ancillary drive devices of the two winch drums are activated.

The technical advance due to the invention as so defined is to be regarded as more particularly meeting the disadvantages of known systems. Owing to the simultaneous synchronous drive of the two winch drums on pulling in the web and on rewinding the tractive elements, the latter are only subject to friction forces and the forces opposing the motion of the draw-in bar. There is the useful effect that additional forces do not have to be overridden, something that results in reduced loading of the tractive elements and in a comparatively small size of the main drive device. This leads to the further effect that the construction of the press is simplified, that more space is available and that the power requirement is not so great. While printing is in progress the locking device, that is arranged approximately in the middle of the web draw-in path, enables the strain to be divided between a rear and a front section of the path so that the strain is considerably reduced. At the same time the winch drums arranged at the press ends, which in normal production operation are driven by their ancillary drive means, are decoupled from each other. As a result it is possible to ensure that when the position of the register rolls, provided with bend wheels, changes, the respective sections of the length, formed by the locking device arranged in the center, are paid off and wound up independently from each other without a preset rope tension being exceeded which is due to the ancillary drive means and is monitored by the monitoring devices. In normal press operation as well there is thus the advantage of a very low tension within the tractive elements. The advantageous effect here is then that the load due to the tractive elements on the servo drives of the register rolls is comparatively small so that it is possible to achieve a high accuracy of register and the servo drive of the register rolls may be comparatively small, something that leads to a lower cost of manufacture of the press. The small strain in the tractive elements results in the advantage of high operational reliability as well. In this context it is assumed that on the breakage of one tractive element, there will not be such a violent whipping effect as with a tractive element under a high degree of tension.

In accordance with a beneficial further development of the invention the tractive elements may be in the form of ropes or cords, trained about bend pulleys, linked to the draw-in bar by toggle clamps. The use of ropes rather than chains leads to a very robust arrangement. In this connection one may assume that the tractive elements will have a longer working life in production and will stand up to dust and raised temperatures. At the same time the ropes make possible a simple attachment to them of the draw-in bar at any desired point along the full draw-in path. The toggle clamps proposed for bar attachment offer the advantage of being quickly released.

In accordance with a further convenient feature of the invention the differential drives associated with the winch drums are each in the form of epicyclic gearing and more especially of a harmonic drive unit, whose central element is able to be moved by the respectively associated ancillary drive means. The result is then a simple, low-price manner of construction which at the same time is sturdy and compact.

In accordance with a further beneficial feature of the invention the winch drums, preferably extending over the full width of the machine, are mounted by bearings on respective shafts, which are respectively driven by the ancillary drive means of the winch drum, and are joined to the central element of the associated differential drive, whose element, which is placed around the central element and is driven by the main drive means, is attached to the associated drum, the ancillary drive means and the differential drive being preferably opposite to each other in relation to the drum. The result of this is a compact but nevertheless straightforward construction with the possibility of uncomplicated access to the individual subassemblies.

In the case of a particularly promising feature of the invention, it is possible for the main drive device to comprise two motors each associated with one drum and having means for keeping them in synchronous operation and which are driven simultaneously in the pull-in and the rewinding operations, while at the same time it is only the ancillary drive means of the winch drum, which is to the rear in the direction of motion and the monitoring device thereof, which are activated whereas the respective other ancillary drive means and its monitoring means are put out of operation. The use of two drive motors for each of the two winch drums leads to a simple construction, more especially in systems having a very substantial distance between the drums. However even in such cases it is possible to correct a small degree of asynchronism of the rear winch drum and to produce an accurately synchronous condition, since here the asynchronism is overcome by the ancillary drive means associated with it. The winch drum that is to the front in the direction of motion of the tractive elements, whose ancillary drive means is put out of operation on draw-in and rewinding, dictates the speed in this respect. The result is that it is possible to make certain that, even if separate motors are used in association with the drums to produce motion in the main drive direction, no additional loading of the tractive elements will result.

There is the advantage that the motor(s) for producing motion in the principal direction may be variable speed (preferably DC) motors; in the case of the employment of two motors the same may be synchronized by synchros. The use of variable speed electric motors, more especially DC motors, leads to the useful feature that it is possible to design for an appropriate acceleration and braking behavior, and this is advantageous when the web is only to be drawn in along part of its path, when in order to avoid tear of the web a particularly smooth acceleration is required or is advantageous.

A further advantageous feature resides in an arrangement in which both the ancillary drive means of the winch drums are provided with their own variable speed electric motors, which, as noted earlier, are three-phase motors. It is then possible to simply process and respond to the control output signal from the monitoring device.

It is an advantage if each monitoring device has at least one jockey pulley around which the tractive element is trained so that the same is kept under tension by the preferred use of a spring, the jockey pulley acting on a series of switches arranged one after the other in the direction of motion of the jockey pulley so that the respectively associated ancillary drive means are operated. There is then the advantage of a simple sensing of position, proportional to tension, only requiring the use of simple switches. In this respect it is an advantage that only one switch is needed for the desired tension level or value and for departures in an upward and downward direction.

As part of a still further development the jockey pulley of the monitoring means is provided with a plunger guided in the direction of its motion, which may be locked by means of a preferably pneumatically operated brake associated with it. The operation of this brake may thus provide a simple way of locking the associated monitoring device on draw-in and on rewind. In accordance with a further development each tractive element may have two securing means arranged at it ends, which each have at least one or preferably two jockey pulleys, with the respective tractive element trained aroun them and tensioning it against the force of a spring, and two switches operating when the maximum and minimum permitted tension is reached and by which the respective main drive means are switched off. This ensures that even in the event of trouble conditions there will be no breakage or excessive slackening of the tractive elements. Since the two tractive elements have two securing means this will also advantageously apply for a case in which one tractive element is excessively slack and the other is too tight. It is an advantage if the jockey pulleys of the two monitoring means are identical to the jockey pulley for the minimum tension of a securing means, this guaranteeing a particularly simple and compact construction. The locking of the other jockey pulleys for the minimum tension may be effected in the same manner as the locking of the jockey pulleys of the monitoring means.

Within the general context of the invention it is furthermore an advantage if pairs of feeder rolls are provided adjacent to the parts of the press through which the tractive elements run, such feeder rolls being able to be brought into engagement with the web and being preferably driven synchronously with the tractive elements by means of an auxiliary longitudinal shaft of the main drive means. These measures provide reliable assistance in drawing in the web and thus an additional way of reducing the load on the tractive elements on drawing in the web, since in this case the leading web end need only be guided by the bar secured to the tractive elements. The pulling effect itself is then transmitted by the auxiliary draw-in means to the web.

It is an advantage if the pairs of pull in rolls are operated and put out of operation by switches responding to the draw-in bar, the arrangement best being so designed that when one pair of draw-in rolls is activated, the other pair of draw-in rolls placed to the front thereof is put out of operation with a time lag. The result of this is that at any one time only one pair of pull in rolls will act on the web and from it the web tension will be constant as far as the roll carrier This will mean that the web will be under tension and free of folds and will draw in without any substantial lateral drift.

To draw in the web along part of the path it may be an advantage if all the pairs of pull in rolls are put into operation simultaneously in order to ensure that inertial forces acting on the paper web are minimized.

Further advantageous forms and convenient developments of the invention will be gathered from the following account of one working example of the invention to be seen in the functional figure and from the claims.

BRIEF DESCRIPTION OF THE DRAWING

The sole FIGURE comprising the drawing schematically illustrates certain subassemblies according to a preferred embodiment of the present invention of a webfed machine.

DESCRIPTION OF THE PREFERRED EMBODIMENTS

Since it may be assumed that the workings of a webfed printing press are generally known, no detailed account thereof will be necessary in the present instance. The subassemblies of the webfed printing press in the path of the paper web 1, include a web roll carrier 2, one, two (as here) or more printing units 3 and 4 and a cutter 5, which may be accommodated in the superstructure of a folder at the delivery end of the press. These subassemblies are only marked in chained lines in the FIGURE to indicate their outlines. The paper web 1 is pulled in by means of a draw-in bar 6, extending across the full width of the press, to which the web is attached by means of clips 7. The bar 6 is detachably secured at its ends to tractive elements 8 and 9, here in the form of ropes of finite length, at the sides of the press by quick release toggle clips 10 enabling the draw-in bar to be set at any desired position along the tractive elements 8 and 9. The ropes constituting the tractive elements 8 and 9 extend for the path along which the paper web 1 moves during printing. The tractive elements 8 and 9 thus also bend at any point at which a deflection or change in direction of the paper web takes place, For this purpose rope bend pulleys 11 are mounted by bearings on the press side frames. Furthermore register rolls 12, which are moved as indicated by the arrows during press operation for adjustment of the register in the peripheral direction, are provided with laterally mounted rope bend pulleys 11. The leading and trailing ends of the tractive elements 8 and 9 wind on and unwind from winch drums 13 and 14 arranged respectively at the two ends of the web draw-in path. The length of the ropes forming the tractive elements 8 and 9 may be such, in this respect, that a certain length is available exceeding the maximum draw-in path of the web in order to take into account any extension of this path due to motion of the register rolls. The winch drums 13 and 14 have a constant diameter and extend over the full width of the press so that two lateral receiving sections are present for the two tractive elements 8 and 9. When the paper web 1 is being drawn in, or when the tractive elements 8 and 9 are being rewound, the two winch drums 13 and 14 are driven synchronously so that the length of rope taken up at one end is equal to the amount of rope paid off at the other end.

The drive of the winch drums 13 and 14 in the two directions may be caused by a common reversible motor. The transmission of torque and the simultaneous synchronisation is in this case brought about by a positive gearing arrangement such as toothed gearing or a toothed belt transmission. However, such an arrangement is only suitable when it is possible for the two winch drums 13 and 14 to be placed close together, that is to say when the roll carrier 2 and the cutter 5 are not too far apart. In the working example presently illustrated each winch drum 13 and 14 is provided with its own reversible drive motor 15, which in the present case has a transmission **15*a* connected with its output shaft, the step-down ratio of such transmission being such that the maximum speed of the tractive elements 8 and 9 is approximately 30 meters per second. In the present case the drive motors 15 are in the form of DC motors synchronized via synchros. DC motors having variable acceleration and braking characteristics, something that in the instant case is particularly valuable for countering inertial effects. The acceleration and braking characteristics are thus so set that there is prolonged acceleration and prolonged braking. The putting into operation of the drive motors 15 for the winch drums 13 and 14 respectively is undertaken manually from a control console which is not illustrated. The switching off of the drive motors 15 may be by limit switches actuated by the tractive elements 8 and 9. In the presently illustrated working example of the invention there is a simple system involving the use of sensors 13*a* and 14*a* sensing the degree of filling of the drums 13 and, respectively, 14**.

The transmission of the torque from each drive motor 15, via the transmission **15*a* connected with the mtoor output shafts, to the respective drum 13 or 14 is not direct but rather via an intermediately positioned differential transmission 16 in the form of an epicyclic drive comprising a central element 16*a* and a peripheral element 16*b*. This applies both for the embodiment of the invention illustrated, based on the use of two separate drive motors, and also for any set-up with only one drive motor for both winch drums. In the illustrated working example the differential drive 16 is in the simple form of a harmonic drive whose outer ring is connected with the respectively associated winch drum 13 or 14 as the case may be and to the output of the respective drive unit, and whose inner ring is connected with an ancillary drive means, able to turn it in either direction and which consists of a variable speed three-phase motor 17 with an output transmission 17*a*. The differential drive 16 and the ancillary drive means connected therewith are arranged at the two ends of the respective drum 13 or 14 and they are connected with each other by a shaft 18 attached to the central element 16*a*** and, respectively, the output of the ancillary drive means.

The respective winch drums 13 and 14 are mounted by bearings on such shafts 18.

The rotation of the differential drive 16 by the ancillary drive means formed by the motor 17 with its associated step-down gearing 17*a* and of the drive of the winch drums 13 and, respectively, 14 by the main drive means in the form of the motors 15 with their output transmissions 15*a*, makes possible a compensation of any asynchronism which may be present despite the synchro connection for synchronisation. When the main drive is stationary it is possible for the tractive elements to be paid off from and wound onto the winch drums 13 and 14 respectively using the ancillary drive means in a production run, in the present case the printing of the web 1, in order to compensate for a variation in the rope length due to a change in the position of the register rolls 12. In both these cases this prevents an overly great increase in tension in the ropes constituting the tractive elements 8 and 9.

The switching on and off of the three-phase motors 17 in the ancillary drive means is by the use of a respectively associated monitoring means 19 responding to the tension in the tractive elements 8 and 9. As a rule it will be sufficient if the monitoring means 19 each sense one tractive element 8 or 9, since the conditions will be the same in the two tractive elements. In the present working example of the invention the monitoring means 19 of the two drums 13 and 14 are so arranged that the one is sensed by the one monitoring means and the other tractive element is sensed by the other monitoring means. The monitoring means each comprise a switch 22 joined to a jockey pulley 21, around which the tractive element 8 or 9 is trained so that the same is held taut by a spring 20 and three further switches 22 placed in a row one after the other in the path of this jockey pulley 21, so that on motion of the associated jockey pulley 21 the switches are actuated and supply output signals to a controller 23, which causes the three-phase motor 17 of the respective ancillary drive means to be driven in the one or other direction and to be switched off. The three switches 22 are so arranged that in each respective case the middle switch corresponds to a given or preset lower target value of the rope tension. This switch serves to stop the three-phase motor 17. The two other switches, which are operated by a positive or, respectively, a negative departure from the target value or set point, cause the three-phase motor to rotate in the one or the other direction so that the respective winch drum 13 or 14 will be acted upon in such direction.

On drawing in the paper web 1 or rewinding the tractive elements 8 and 9 the speed of motion of the tractive elements 8 and 9 is dictated by the speed of rotation of the front end drum, in the present case the drum 14. The speed of rotation of the back end drum is exactly matched to this. In the case of arrangements with one main drive means, which only comprise one drive motor and a mechanical connection with the two drums, this will result automatically. In the set-up illustrated with an individual drive for each of the two winch drums 13 and 14 this effect is produced by causing only that monitoring means 19 to be put into operation which is associated with the rope-entrained drum (in the present case the drum 13) and the monitoring means 19 for the other winch drum is locked. For locking the monitoring means 19 there is a pneumatically operated brake 24, which is able to be put into engagement with a plunger 25 connected with the respective jockey pulley 21 as is indicated in the FIGURE with reference to the monitoring means 19 associated with the winch drum 14 at the cutter end of the press. In the case of any asynchronism of the two winch drums 13 and 14 there will be an increase or decrease in the rope tension respectively and a resulting displacement of the jockey pulley 21 of the operational monitoring means 19 out of the middle setting at the middle switch 22 so that one of the two switches flanking the middle switch 22 will be operated and the three-phase motor 17 of the ancillary drive means will be turned in the one or the other direction. This in turn causes the central element 16*a* of the differential drive 16 to be moved in the one or the other direction so that there will be a correction motion superimposed on the drive motion caused by the main drive means 15 and 15*a*. This is continued until the tension has reverted to the desired value and the jockey pulley 21 has accordingly assumed a position in which the middle switch 22 is operated.

During normal printing operation the main drive means, here in the form of the two DC motors 15, is turned off. At the same time the two monitoring means of the two winch drums 13 and 14 are operational, i.e. the plungers 25 of the two monitoring means are unlocked. As long as the register rolls 12 are in a preset position the tractive elements 8 and 9 will be practically still. As soon as the position of one or more register rolls 12 changes this will cause a change in the tension of the tractive elements 8 and 9 and accordingly a corresponding change in the position of the jockey pulley 21 of the two operational monitoring means 19. This control deviation will be met by operation of the three-phase motor 17 of the ancillary drive means, such motor then driving the central element 16*a* of the differential drive 16 in the desired direction. This leads, in the case of non-rotation of the main drive, to the requisite motion of the external element 16*b* and thus to a corresponding rotation of the respective winch drum 13 or 14, respectively so that rope is paid off or wound up. Decoupling of the two monitoring means 19, which in normal printing are operational, is caused by a locking means 26, placed half way along the web draw-in path, by means of which the two tractive elements 8 and 9 may be held at the middle of the path. The locking means 26 consists here of two brake jaws placed on either side of tractive element 8 or 9 and able to be jammed onto it by means of an associated pneumatic cylinder. The two pneumatic cylinders are so coupled with each other that they are generally moved in ganged synchronism with each other.

In order to prevent the rope tension from becoming so great during defective press operation that the tractive elements 8 and 9 snap or becomes so low that the tractive elements 8 and 9 come clear of the means supposed to be guiding them, there are securing means for each tractive element 8 and 9 at its ends adjacent to the winch drums and these devices stop the main drive means when a maximum or minimum tension is exceeded or gone below. These securing means respectively comprise two jockey pulleys 27 around which the tractive elements 8 and 9, respectively, are trained, and which are loaded by springs 28 which respond to rope tension. These springs are so designed that the one jockey pulley only responds to an excessive increase in tension and the other jockey pulley only responds to an overly great decrease in tension. The jockey pulleys 27 are similar to the jockey pulleys 21 of the monitoring means 19 insofar as they are connected with a plunger 29 by which a respectively associated switch 30 is actuated with a preset tension level is reached. With the aid of these switches, which are connected with each other in parallel, the main drive means, here in the form of the DC motor 15 associated with the adjacent winch drum 13 or 14, may be switched off. In order to achieve a particularly compact construction the above-mentioned securing means may be integrated with a monitoring means having a jockey pulley 21. This is made possible by the jockey pulley 21 of the monitoring means 19 serving at the same time as jockey pulley for minimum tension of the securing means. The associated switch 30 is in this case adjacent to the three switches 22 of the monitoring means 19. The jockey pulleys 27 for the minimum tension of the securing means, not integrated with a monitoring means 19, are able to be locked like the jockey pulleys of the monitoring means in order to avoid undesired flutter of the monitoring means 19 when the paper web 1 is being pulled in and when the elements 8 and 9 are in the process of being rewound. In accordance with this the plunger 29 of these jockey pulleys like the plunger 25 of the jockey pulleys 21 has a pneumatically operated brake 31. During normal press operation all the securing devices and the two monitoring means 19 are operational. The operation of the operating cylinders for the brakes 21 and 31, respectively, and the locking means 26 is through solenoid valves 32, which are controlled from a console.

To reduce the load on elements 8 and 9 on drawing in the paper web 1 there are draw-in feeders adjacent to the press subassemblies adjacent to the path of the web 1, that is to say at the roll carrier 2, the printing units 3 and 4 and the cutter 5. The draw-in feeders may be connected and disconnected with the web. In the present case they take the form of a pair of draw rolls 33 with rubberized outer faces. The ancillary longitudinal shaft 34 is driven from the main drive means, here in the form of a DC motor for the winch drum 14 drawing the paper and thus at the front end thereof. The drive of the pair of pull rolls 33 for web 1 is synchronous with the pull-in bar 6 and thus with elements 8 and 9 accepting the leading end thereof. In many cases it is also possible to have a drive, independent of the drive of the tractive elements 8 and 9, for the ancillary longitudinal shaft may be needed and vice versa, as is for example true on rewind of the tractive elements. To make this possible a separating clutch 36 is placed between the ancillary longitudinal shaft 34 and the DC motor 15 driving same, and between the step-down gearing 15*a* following it and the respective winch drum 14. For a further securing effect the winch drum 14, which is able to be uncoupled, has an arresting brake 37, which is also operated by a control valve 32 and may be so designed that it automatically becomes operative when the line voltage fails.

One of the rolls of the pair of rolls 33 is respectively able to pivot so that the the pair may be selectively engaged with the web 1 and disengaged therefrom. For part-length draw-in (i.e. after tearing of the web) all pair of draw-in rolls 33 are made operational in order to minimize the force on the web 1. During regular paper draw-in on the other hand only the last draw-in feeder passed by the draw-in bar will be operational. The pair of draw-in rolls before it will be operated with a time lag owing to the use of switches 38 responding to the draw-in bar.

We claim:

1. A device for drawing a web into a machine adapted to process the web having at lest two web processing units and side frames with register rolls, associated with said units, around which the web is run, said device comprising:

- a draw-in bar to be detachably connected to a leading end of the web;
- bend pulleys;
- traction elements of finite length for detachable connection with said bar and running over said bend pulleys arranged adjacent to the side frames of the machine, such elements extending along the full path along which the web is to be drawn into the machine for processing same, said traction elements having first and second opposite ends;
- first and second winch drums placed at opposite ends of the machine, said first ends of the traction elements at one end of the machine being attached to said first winch drum at one end of the draw-in web path and said second opposite ends of the elements being attached to said second winch drum at the other end of the machine;
- drive means for rotating said first and second winch drums for unwinding the traction elements from the first drum and winding them onto the second drum at the opposite end of said machine, moving said draw-in bar along the web path, and rewinding them,
- said drive means comprising for each drum:
- a main drive means for turning such drum in either direction and substantially simultaneously with said other drum;
- an ancillary drive means;
- a differential drive connecting said main drive means and said ancillary drive means with said drum for driving same;
- a monitoring means for detecting tension in at least one of said tractive elements; and
- controller means linking said monitoring means with said ancillary drive means for modifying the output speed of said differential and hence the speed of said traction elements in accordance with changes in traction element tension; and
- locking means placed generally midway between said first and second winch drums along said web path for immobilizing said traction elements when said machine is processing said web, and said monitoring means are in operation.

2. The device as claimed in claim 1 wherein said traction elements are in the form of ropes trained over said bend pulleys, said draw-in bar including toggle clamps thereon for attachment to said traction elements at both ends thereof.

3. The device as claimed in claim 1 wherein said differential drives connected with said winch drums are in the form of epicyclic transmissions each having a central element connected with said ancillary drive means for causing rotation of said central element and modifying rotation of said drum connected with said epicyclic drive transmissions.

4. The device as claimed in claim 3 wherein said epicyclic transmission are in the form of harmonic drives.

5. The device as claimed in claim 3 further comprising:

- shafts extending from one side frame of said machine towards the other side frame, said drums being mounted by bearings on said shafts for rotation in relation thereto, said drums being of sufficient length to extend substantially from one side frame to the other;

means connecting said ancillary drive means with said shafts and means connecting said shafts with said central elements of said differential drives; and outer elements of said transmissions being connected with said drums for driving them in a way responsive to outputs of said main and ancillary transmissions.

6. The device as claimed in claim 5 wherein one ancillary drive means is placed at one end of one of said drums and one differential drive is placed at the other opposite end of this drum.

7. The device as claimed in claim 1 wherein each main drive means of each one of said drums comprises two motors adapted to be simultaneously operated for winding said traction elements from said first drum to said second drum and and back again with the operation of only the ancillary drive means connected with the first drum and the monitoring means associated therewith while the ancillary drive means connected with the second drum and the monitoring means connected therewith are not operating.

8. The device as claimed in claim 7 wherein each motor of each main drive means is in the form of a variable speed motor with control means for adjusting its acceleration and braking properties.

9. The device as claimed in claim 8 wherein said motors are DC motors.

10. The device as claimed in claim 8 further comprising two such motors with synchros for causing them to run in synchronism.

11. The device as claimed in claim 1 wherein said ancillary drive means associated with said two drums each comprise a variable speed electric motor.

12. The device as claimed in claim 1 wherein each monitoring means comprises a jockey pulley engaging one of said traction elements, and switches placed so as to be consecutively operated by said jockey pulley in response to changes in tension of said traction elements, said switches being connected electrically with said respective ancillary drive means for operation thereof.

13. The device as claimed in claim 12 further comprising a plunger connected with said jockey pulley and guided to move in the direction of motion of said jockey pulley and brake means for acting on said plunger.

14. The device as claimed in claim 13 wherein said brake is pneumatic.

15. The device as claimed in claim 12 wherein each monitoring means comprises three switches placed consecutively in a row with one such switch in the middle of the row, said middle switch representing a target value for the traction element tension.

16. The device as claimed in claim 1 wherein said ancillary drive means and their monitoring means are placed adjacent to the drums with which they are operatively connected.

17. The device as claimed in claim 16 wherein said monitoring means are adapted to sense the tension in respectively different ones of said traction elements.

18. The device as claimed in claim 1 further comprising securing means associated with the end of each traction element, each such securing means comprising at least one pulley for engaging such respective traction element and a switch to be operated by said pulley for switching off the respective main drive means when the tension in the said traction element passes out of a certain intermediate allowable range between an excessively high and an excessive low tension range.

19. The device as claimed in claim 18 wherein each said securing means comprises two such pulleys.

20. The device as claimed in claim 19 wherein each securing means further comprises a brake, and one of said two pulleys of each said securing device is adapted to respond to any fall in the traction element tension below a minimum limit thereof and to cause said brake to act on said tractive element.

21. The device as claimed in claim 20 comprising pneumatic means for operation of each securing means brake.

22. The device as claimed in claim 1 wherein said monitoring means comprise tension sensing pulleys, said monitoring means also being adapted to act as traction element securing means for said traction elements and having a plunger connected with said pulley for operation of a switch adjacent further switches forming part of said monitoring means.

23. The device as claimed in claim 1 wherein said locking means for said traction elements each comprise at least two braking jaws.

24. The device as claimed in claim 23 wherein each locking means comprises a pneumatic actuator cylinder for causing said brake jaws to act on said respective traction element.

25. The device as claimed in claim 1 wherein said machine is a web printing press comprising a web roll carrier, printing units, a cutter and pairs of feeder rolls placed along the web path for introduction of the web into said machine.

26. The device as claimed in claim 25 further comprising an auxiliary longitudinal shaft in said press for driving said pairs of feeder rolls in synchronism with said traction elements.

27. The device as claimed in claim 26 further comprising a drive motor associated with said main drive means of said second drum and connected with said longitudinal shaft for driving said pairs of feeder rolls.

28. The device as claimed in claim 27 wherein said pairs of feeder rolls are rubber coated.

29. The device as claimed in claim 27 further comprising clutch means for disconnecting said drive motor from said longitudinal shaft and/or said drum associated with said drive motor.

30. The device as claimed in claim 29 wherein each such pair of feeder rolls comprises at least one pivotally arranged roll and a switch actuated by said draw-in bar in order to cause said pair of feeder rolls to be brought into and out of engagement with each other.

31. The device as claimed in claim 30 further comprising means for causing said pair of feeder rolls to be put into operation consecutively one after the other along the length of the machine such that there is a time lag between the, consecutive operation of each pair after the pair to the rear in the direction of travel of the draw-in bar is put into operation.

32. The device as claimed in claim 31 further comprising means for additionally putting all pairs of feeder rolls into operation simultaneously.

33. The device as claimed in claim 1 further comprising an arresting brake for operation on one of said drums in case of power failure.

34. The device as claimed in claim 33 wherein said arresting brake is associated with that drum away from which said draw-in bar is to be moved during draw-in of the web.

* * * * *